United States Patent [19]

Campanelli et al.

[11] Patent Number: 5,526,020

[45] Date of Patent: Jun. 11, 1996

[54] IMAGE EDITING SYSTEM AND METHOD HAVING IMPROVED AUTOMATIC OBJECT SELECTION

[75] Inventors: Michael R. Campanelli, Webster; Dennis L. Venable, Rochester, both of N.Y.

[73] Assignee: Xerox Corporation, Stamford, Conn.

[21] Appl. No.: 101,097

[22] Filed: Aug. 3, 1993

Related U.S. Application Data

[63] Continuation of Ser. No. 772,718, Oct. 7, 1991, abandoned.

[51] Int. Cl.$^6$ .................................................... G09G 5/00
[52] U.S. Cl. ........................ 345/145; 345/150; 345/153; 345/157
[58] Field of Search ................. 382/17, 18, 48, 382/50, 51, 52; 340/703; 358/22, 453; 345/145, 157, 150, 153; 395/155

[56] References Cited

U.S. PATENT DOCUMENTS

| | | | |
|---|---|---|---|
| 4,709,230 | 11/1987 | Popowski | 340/703 |
| 4,797,738 | 1/1989 | Kashi et al. | 382/17 |
| 4,837,635 | 6/1989 | Santos | 358/453 |
| 4,905,148 | 2/1990 | Crawford | 382/16 |
| 4,958,375 | 9/1990 | Reilly et al. | 382/14 |
| 4,975,970 | 12/1990 | Zettel et al. | 382/18 |
| 5,003,616 | 3/1991 | Orita et al. | 382/41 |
| 5,014,327 | 5/1991 | Potter et al. | 382/14 |
| 5,029,224 | 7/1991 | Fujisawa | 358/453 |
| 5,105,466 | 4/1992 | Tsujiuchi et al. | 382/17 |
| 5,105,469 | 4/1992 | MacDonald et al. | 382/18 |
| 5,130,935 | 7/1992 | Takiguchi | 382/17 |
| 5,172,423 | 12/1992 | France | 382/17 |
| 5,216,498 | 6/1993 | Matsunaga | 382/48 |
| 5,247,585 | 9/1993 | Watanabe | 382/48 |

*Primary Examiner*—Richard Hjerpe
*Assistant Examiner*—Kara Farnandez Stoll
*Attorney, Agent, or Firm*—Finnegan, Henderson, Farabow, Garrett & Dunner

[57] ABSTRACT

An image editor stores color pixels for an image to be edited in an image pixel buffer and a lookup register bank. The stored image is displayed on a monitor. An operator uses a mouse to designate a screen path that identifies an object in the image, and pixel position data is detected for the screen path. A programmed computer determines in real time one or more criteria for a search controller on the basis of hue, saturation and luminance variables which are determined from the stored pixel color data for pixels along the screen path. The computer further searches the image pixels to identify the object and its boundaries in accordance with the search controller criteria, and applies color edit actions to the identified object within the image.

31 Claims, 7 Drawing Sheets

IMAGE EDITING SYSTEM AND METHOD HAVING IMPROVED AUTOMATIC OBJECT SELECTION

This application is a continuation, of application Ser. No. 07/772,718 filed Oct. 7, 1991, now abandoned.

CROSS REFERENCE TO RELATED APPLICANTS

Reference is made to the following concurrently filed patent applications that are assigned to the present assignee and are hereby incorporated by reference:

U.S. patent application Ser. No. 07/772,717, entitled IMAGE EDITING SYSTEM AND METHOD HAVING IMPROVED COLOR KEY EDITING by Dennis L. Venable.

U.S. patent application Ser. No. 07/772,719, entitled IMAGE EDITING SYSTEM AND METHOD HAVING IMPROVED MULTI-DIMENSIONAL EDITING CONTROL by Dennis L. Venable and James E. Bollman.

Reference is also made to the following patent application assigned to the present assignee:

U.S. patent application Ser. No. 07/517,895 entitled COLOR EDITING WITH SIMPLE ENCODED IMAGES, and filed by James E. Bollman and Myra E. Van Inwegen on May 2, 1990.

BACKGROUND OF THE INVENTION

The present invention relates to image processing systems and methods and more particularly to the selection of objects within an image for edit or other processing.

Various kinds of image processing systems employ object selection in image edit or other image processing operations. One such system is a duplicator system in which a stored electronic image can be edited and applied to a platen to produce a hard copy output. Another system is a reprographic system in which a digital image is scanned from a hard copy input and then processed through an image editor to generate an edited hardcopy output from a laser printer or the like. In an image edit system, an image editor processes stored images in accordance with edit operations and stores the edited images electronically for use in other systems.

Object selection is usually done by a selecting mechanism that physically draws a border around the selected object on the display screen. The selection mechanisms include freehand, squares, rectangles, circles, polygons, and other geometric shapes. Some approaches employ the physical drawing method along with intelligent algorithms that analyze the image content of the bounded object.

It is desirable that the productivity of the image editing process be enhanced through increased automation of the object selection procedure. The above-referenced use of algorithms in the prior art represents attempts to achieve increased productivity through computer participation in the object selection.

However, raster images differ in many ways and these differences have made it difficult to achieve quality image editing with increased productivity in object selection. Criteria that work well for selecting an object in one image may not work well in another image. In fact, a criterion that works well in one area of an image may not work well in another area of the same image. Differences in image representations, such as black/white or grayscale or color, present additional difficulties to the automation of object selection. Thus, there is no known way to model an object selection algorithm to work well for all different types and classes of images.

The following prior patents have been identified as having limited relevance to the present invention:

1. U.S. Pat. No. 4,905,148, "Three-Dimensional Surface Representation Using Connectivity Method Without Leaks", dated Feb. 27, 1990, filed by Carl R. Crawford.
2. U.S. Pat. No 4,958,375, "Parallel, Multi-Unit, Adaptive Pattern Classification System Using Inter-Unit Correlations and An Intra-Unit Class Separator Methodology", dated Sep. 18, 1990, filed by Douglas L. Reilly, et al.
3. U.S. Pat. No. 5,003,616, "Image Processing Apparatus", dated Mar. 26, 1991, filed by Miyohiko Orita, et al.
4. U.S. Pat. No. 5,014,327, "Parallel Associative Memory Having Improve Selection and Decision Mechanisms for Recognizing and Sorting Relevant Patterns", dated May 7, 1991, filed by Terr, W. Potter, et al.

SUMMARY OF THE INVENTION

The present invention has been made in view of the above circumstances and has as an object achieving significantly improved automatic object selection substantially without shortcomings of the prior art.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

Accordingly, an image editor, provided for an image processing system in accordance with the present invention, comprises means for storing color data for pixels of an image to be edited and means for displaying the stored image on a monitor.

Means are provided for designating a screen path that identifies an object in the image. Means are provided for detecting pixel position data corresponding to the screen path.

Further means are provided for determining in real time one or more criteria for a search controller as a function of the stored pixel values for pixels along the screen path. Means are provided for searching the image pixels to identify the object and its boundaries in accordance with the search controller criteria, and for applying color edit actions to the identified object within the image.

BRIEF DESCRIPTION OF THE DRAWINGS

The accompanying drawings, which are incorporated in and constitute a part of this specification, illustrate one embodiment of the invention and together with the description provide an explanation of the objects, advantages and principles of the invention. In the drawings.

DESCRIPTION OF THE PREFERRED EMBODIMENT

Reference will now be made in detail to a preferred embodiment of the invention, an example of which is illustrate the accompanying drawings.

Figure 1:
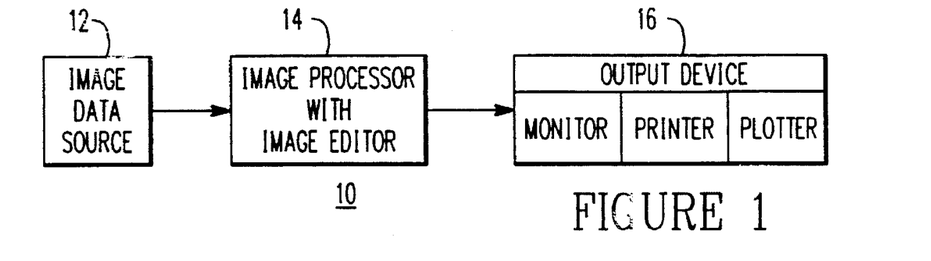
FIG. 1 shows a block diagram for a generalized image processing system in which an image editor arranged in accordance with the present invention is employed.

There is shown in FIG. 1 a general image processing system 10 which is representative of the various kinds of systems in which the present invention can be embodied. Image processing systems may be used for various purposes including the generation of images in the computerized process of creating newspapers, magazines, catalogs, brochures or other documents. High image quality is normally required to meet advertising artwork and other graphic needs in these processes.

The system 10 includes an image data source 12 that provides image data for an image processor 14 having an image editor. Processed image data is applied to an output device 16 such as a monitor, a laser or other printer, or a duplicating machine platen.

The image data may be organized for high quality, high density color displays. For example, in the preferred embodiment the combined basic colors, i.e., red, green and blue, of each image element or pixel are stored as a total of twenty-four bit values. Each basic color can have $2^8$ or 256 values from 0 to 255. Accordingly, the total number of possible colors for each pixel in a color image is $256^3$ or greater than 16 million. In the preferred embodiment of the invention, effective, fast, quality image editing is achieved with computer capacity economy by encoding stored image data to a reduced color set, i.e., a set of 100 preselected colors in this particular case.

Figure 2:
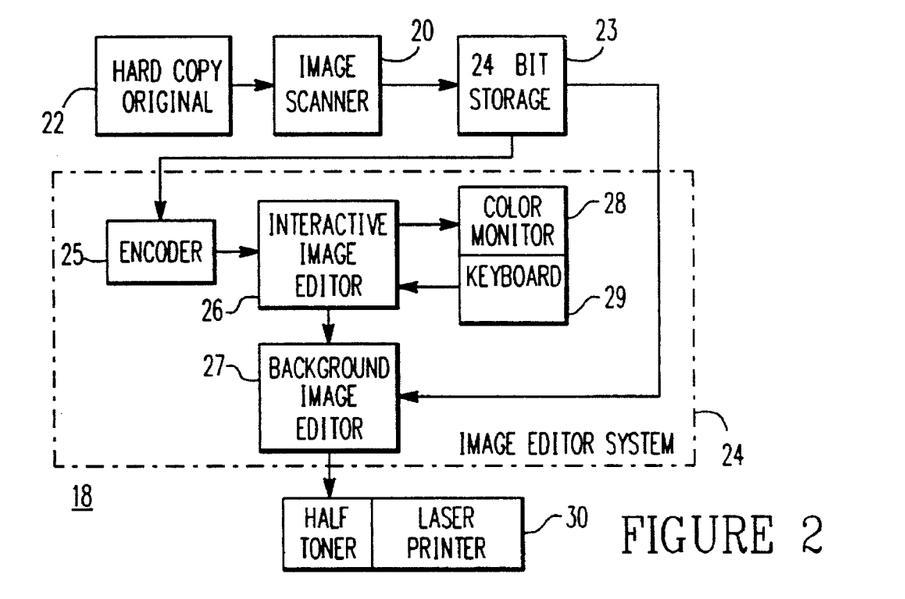
FIG. 2 shows a block diagram for a reprographic system which is a particular form of the image processing system of FIG. 1.

In FIG. 2, there is shown a specific kind of image processing system 10, namely a reprographic system 18, in which the present invention can be embodied. The reprographic system 18 may be a duplicating system which has an image editing capability.

An image scanner 20 detects image data from a hard copy original 22. The image data is placed in 24-bit storage 23 and then processed through an image editor system 24. An encoder 25 produces reduced image data based on a reduced color set, and the reduced image data is applied to an interactive image editor 26.

The image edit system 26 processes the stored image to produce a modified image resulting from editing operations including operations performed in accordance with the present invention. A color monitor 28 and a keyboard 29 are interactively operated with the image editor 26 in the editing process. Inputs are applied from the 24-bit storage 23 and the interactive image editor 26 to a background image editor 27. The edited image is applied from the background image editor 27 to an output device, in this case a laser printer 30 that will produce a requested number of copies.

Figure 3:
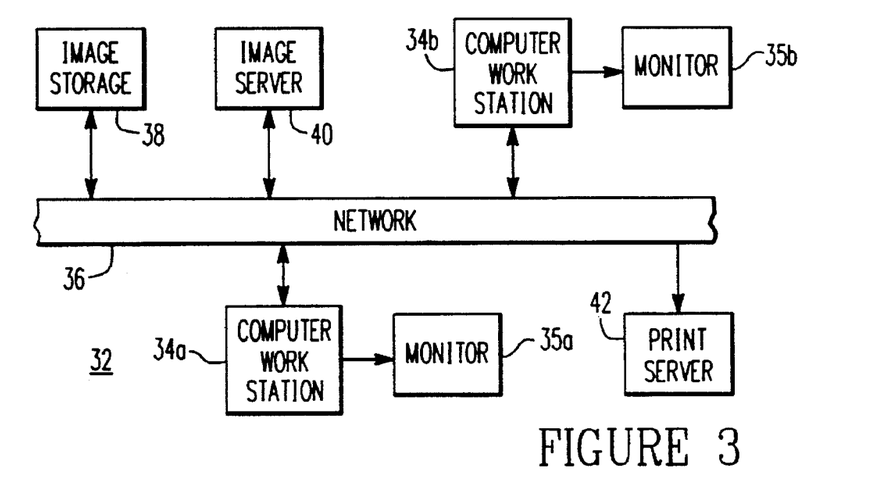
FIG. 3 shows another block diagram for a network based image processing system in which the preferred invention embodiment described herein is employed.

In FIG. 3, another kind of image processing system 10 is shown, namely a networked system 32 having a plurality of image editing computer work stations 34a and 34b with associated color monitors 35a and 35b. A network 36 for the system 32 additionally has coupled to it an image storage apparatus 38, an image server 40 and a print server 42, and, if desired, various other subsystems. On request, the image server 40 provides various more complex image processing services to the work stations. The networked system 32 is the type of system in which the preferred embodiment of the invention is implemented.

IMAGE EDITING WORK STATION

Figure 4:
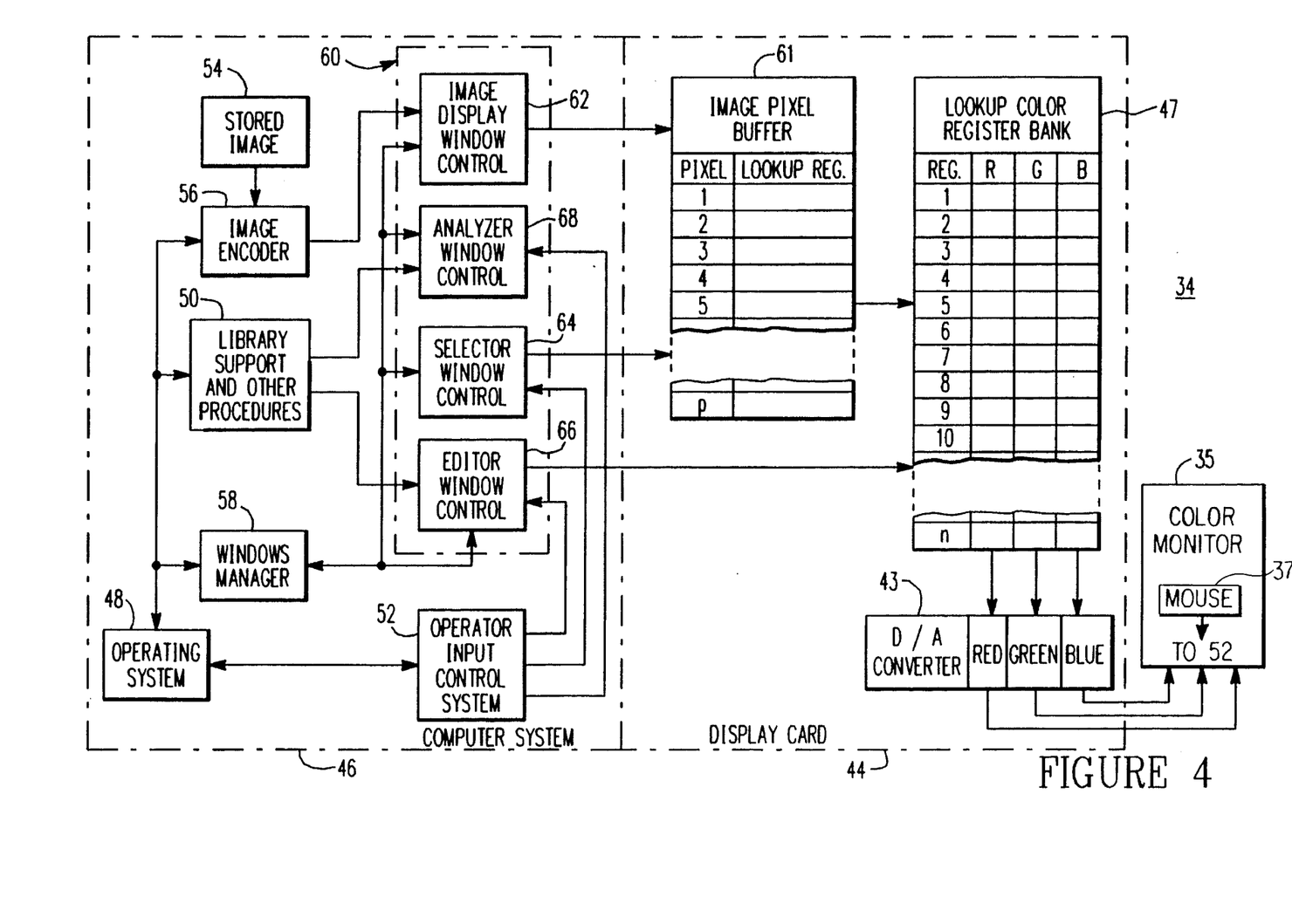
FIG. 4 illustrates a more detailed block diagram for a computer work station arranged in accordance with the principles of the present invention and employed in the network based system of FIG. 3.

An image editing work station 34, corresponding to the work station 34a or 34b in FIG. 3, is shown in greater block diagram detail in FIG. 4. A color monitor 35 provides a display in accordance with red, green, and blue color signals generated by drive circuit means. In the preferred embodiment, the drive circuit means preferably comprises a digital-to analog-converter 43 on a display card 44.

An indicated in FIG. 4, a digital color signal for each screen pixel comprises digital red, green and blue signals supplied by lookup color registers 47. Each of the three components of the color signal is an 8-bit signal. Successive screen pixel signals are converted to analog signals by the converter 43 and rastered onto the monitor screen 35 in the conventional manner.

A digital computer system 46, such as a Sparc Station II™ preferably operates the display card 44 to generate the monitor display. In other applications of the invention, the functional interface between the digital computer system 46 and the display card 44 may be varied from that which exists in the preferred embodiment.

Programmed operation of the computer system 46 occurs under the direction of an operating system 48 such as UNIX™. Library support and other procedures 50 are included in the computer program system as needed for the image processing application and for system operation.

An operator input control system 52 includes means for entering image editing actions and for otherwise directing the computer system operation. In the preferred embodiment, the operator input control system 52 includes a mouse 37 which provides various kinds of operator editing entries through interaction with the display on the color monitor 35. The preferred operator control also includes a keyboard for operator input of alphanumeric editing entries. In other applications of the invention, other operator control devices, such as light pens, pressure sensitive pads, etc., can be employed.

Images to be processed by the work station 34 are suitably stored. Each image is formed by a predetermined number of pixels each of which is typically, and herein preferably, defined by three 8-bit words respectively for the red, green and blue color components.

When a stored image 54 is called by the operator for edit processing, the image 54 is first processed in the preferred embodiment by an image encoder 56 to encode the image with a reduced set of preselected colors for effective yet economic image editing for reasons previously explained. A conventional image algorithm program, such as Floyd-Steinberg error diffusion, is employed for the image encoder 56.

Image editing is preferably facilitated in the work station 34 by the use of a windowed display on the screen of the color monitor 35. A conventional windows manager 58 or control, such as "Windowing System", as developed by MIT, is employed in the computer program system to control the basic windowed structure of the monitor display.

Image editing means is included in the work station 34 to enable the image 54 to be modified in various ways. The image editing means preferably includes the operator input control system 52, various computer editor controls 60, and an image storage means preferably including the lookup color register bank 47 and an image pixel buffer 61 on a display card 44.

As previously indicated, prior art techniques for editing images have typically employed procedures having limited productivity. The present invention provides significantly enhanced productivity through the image editing means which is characterized with improved structure and operation.

The encoded image provided by image encoder 56 is handled by an image display window control 62 for display in an image window (not specifically shown) on the screen of the monitor 35. The size and location and screen pixel assignments of made for the image window are determined by the windows manager 58. The color content of each image pixel in the image display window is defined by an image pixel buffer 61 in combination with the lookup color register bank 47.

The lookup color register bank 47 contains n registers including a group of registers that respectively define the R, G, and B values of the respective colors in the set of colors preselected for system use. The color lookup register assigned to a particular image pixel generates the output color signals that produce the screen pixel corresponding to the image pixel.

The image display window control 62 loads the encoded image into the image buffer 61. In the preferred embodiment, the encoded image includes an index value for each image pixel pointing to a color lookup register that contains the R, G, and B values corresponding to the color for that pixel. As indicated in FIG. 4, the image pixel buffer 61 stores the number of the lookup register specified for each image pixel. Image pixels are thus processed for screen display by reference to the designated lookup registers in the pixel buffer 61.

The editor controls 60 also include an area pixel selector window control 64 that is operated through a selection menu window 59 (FIG. 5B) and provides the operator with options for limiting or providing boundaries on the extent to which the image stored the buffer 61 is to be subjected to color and other edit actions. In the preferred embodiment, the optional selectors include:

a. Brush.
b. Freehand.
c. Rectangle.
d. Polygon.
e. Color key.
f. Automatic object selector.

Once a pixel selector is chosen by the operator, color editing of the image is limited to pixels defined by the chosen selector.

Figure 5A:
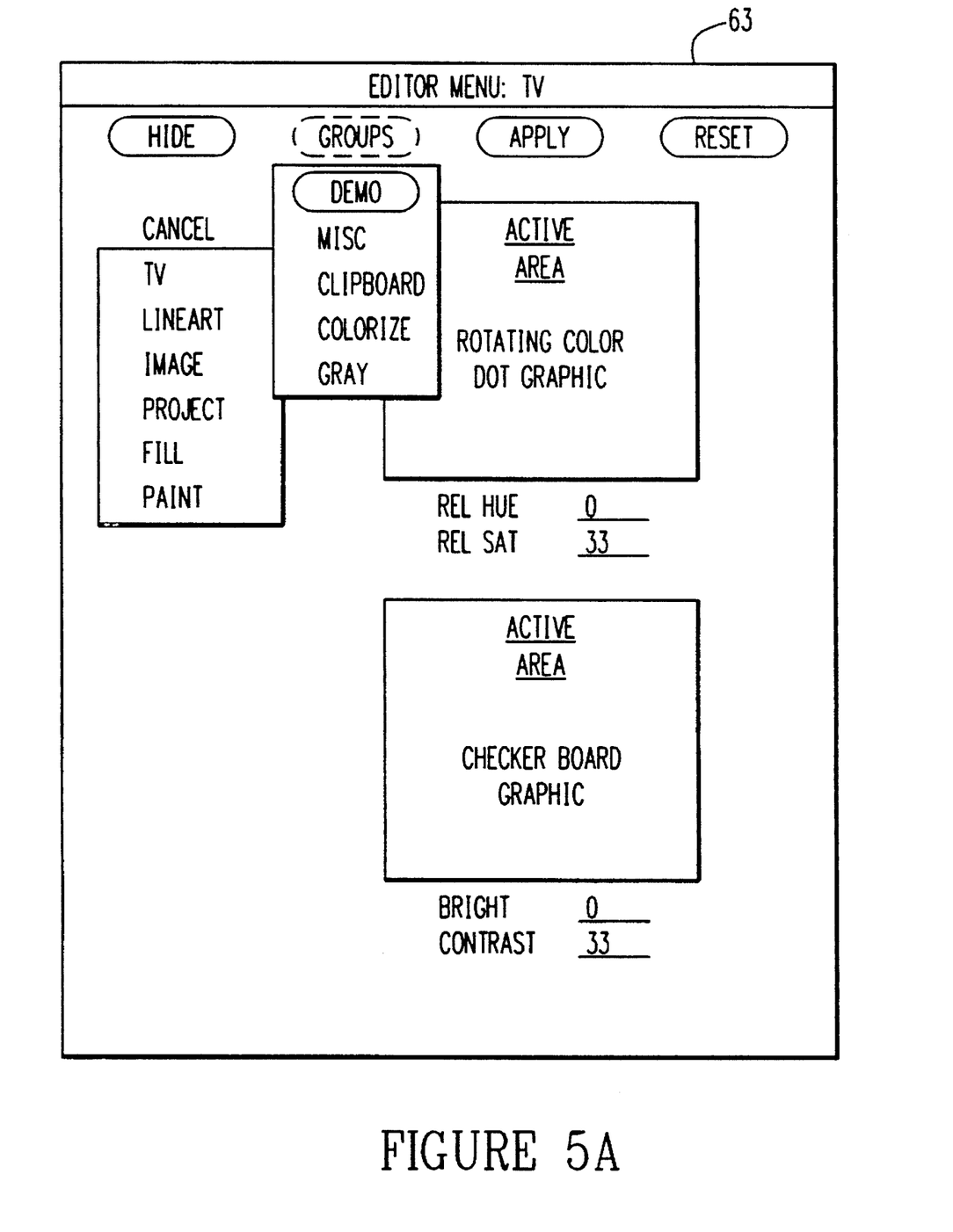
FIGS. 5A and 5B show editing controls and selector menus employed on a screen of a work station monitor in accordance with the present invention.
Figure 5B:
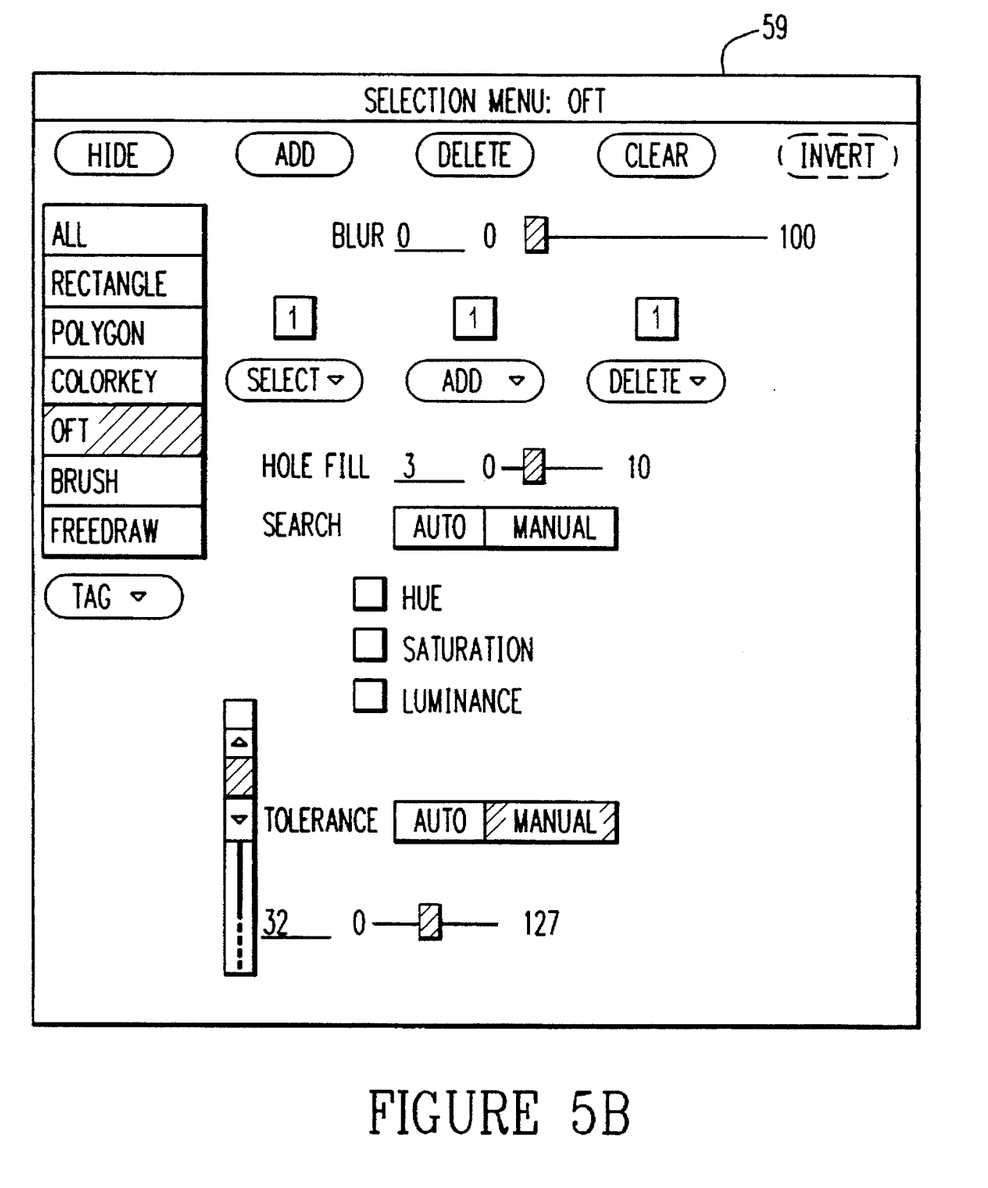

An editor window control 66 implements various editorial operations selected by the operator from an editor menu window 63 (FIG. 5A). In the preferred embodiment, editorial operations or user procedures that can be selected include:

a. TV color.
b. Line art.
c. Image color.
d. Hi-light.
e. Rotate.
f. Crop.
g. Scale.
h. Filter.

In many of the user procedures, operator selections in an active box in the editor menu window are implemented in real time on the image in the image window. In other cases, operator selections are displayed in a separate box in the editor menu window and then implemented on the image in the image window upon operator command.

In the various edit operations, color modifications are implemented through the color lookup bank 47 as indicated in FIG. 4. Thus, any single original color selected for change to a selected new color, in accordance with a particular edit operation, is changed to the new color by modifying the R, G, B values in the lookup register for the original color and storing the modified values in a work lookup register bank.

When the image is thereafter displayed in the image window, any screen pixels in the image, or within selected limits of the image, that have the specified single original color are automatically assigned the modified color in the work register. Multiple color modifications in a single edit operation are simultaneously implemented in the manner described for the single color modification.

An analyzer window control 68 enables the operator to employ the computer to provide image analysis. For example, the operator may request: get pixel color or provide histogram.

Once an edited image becomes acceptable to the operator, it is saved by actuating a save operation and implementing appropriate save procedures. The system can then be cleared to its initialized state and a new image may be called from storage for editing.

AUTOMATIC OBJECT SELECTION

In accordance with the present invention, automatic object selection means operates within an image editing system to provide better image editing with improved system productivity. In the present embodiment, the automatic object selection (AOS) means includes the automatic object selector in the selector window control 64 in FIG. 4 and the operator input control system 52. Object selection limits the extent to which edit operations change the stored image, i.e., the image pixels to be edited are limited In the prior art, object selection procedures have typically been very slow, and often painfully slow. Editing difficulty has arisen as a result of the inability or difficulty of adapting available object defining criteria to achieve fast and effective selection of actual objects during edit operations.

As previously indicated, intelligent algorithms have been used to provide some automation in object selection, but improvements have been very limited because of selection criteria limitations coupled with the great variability of raster images.

The present invention achieves better image editing with higher productivity first by developing object search criteria in real time as a function of image context and thereafter implementing the object search in accordance with the developed criteria. In effect, these mechanized operations produce fast generally accurate and automatic object selection for significantly improved productivity during image editing.

In the preferred embodiment, a mouse 37 (FIG. 4) is employed to provide interactive editing control for the system operator. Path data is collected during click-and-drag mouse operation, and statistical image data is retrieved from a buffered image as a function of the path data. When the mouse button is released, an object selection model is developed from statistical analysis of the retrieved data The model may include one or more selection criteria.

As one general example, the basic image color data used for model determination may be red, green and blue color channels. After a mouse drag and release, the statistical output may be (values defined relative to 1-byte storage):

| CHANNEL | AVERAGE VALUE | STANDARD DEVIATION |
|---|---|---|
| 1.) red | 145 | 3.2 |
| 2.) green | 25 | 23.5 |
| 3.) blue | 200 | 5.5 |

In this case, the standard deviation of the green channel is excessive. The search model accordingly is defined so that the object is selected through the red and blue channels. With standard statistical analysis, the search model can be structured to accept image color data as selected object data if the color data falls within the average value plus or minus 2 Sigma for the red and blue channels.

As another example, the image color data used for model determination may be defined to be multiple color descriptors such as hue, saturation and luminance. After a mouse drag and release, the statistical output may be:

| CHANNEL | AVERAGE VALUE | STANDARD DEVIATION |
|---|---|---|
| 1.) Hue | 145 | 0 |
| 2.) Sat | 25 | 0 |
| 3.) Lum | 200 | 0 |
| n.) — | — | — |

In this case, the search model is represented by the value averages for all three of the color data channels. The search then is conducted with statistical analysis as previously described.

Various basic color variables or color descriptor variables may be used to structure the search model in practicing the present invention. Hue, saturation, and luminance constitute one set of color descriptors (or color space) that has been found from experience to optimize the effectiveness of automatic object selection in accordance with the invention. Accordingly, hue, saturation, and luminance channels are the color data channels preferably used in implementing the present invention.

Figure 6A:
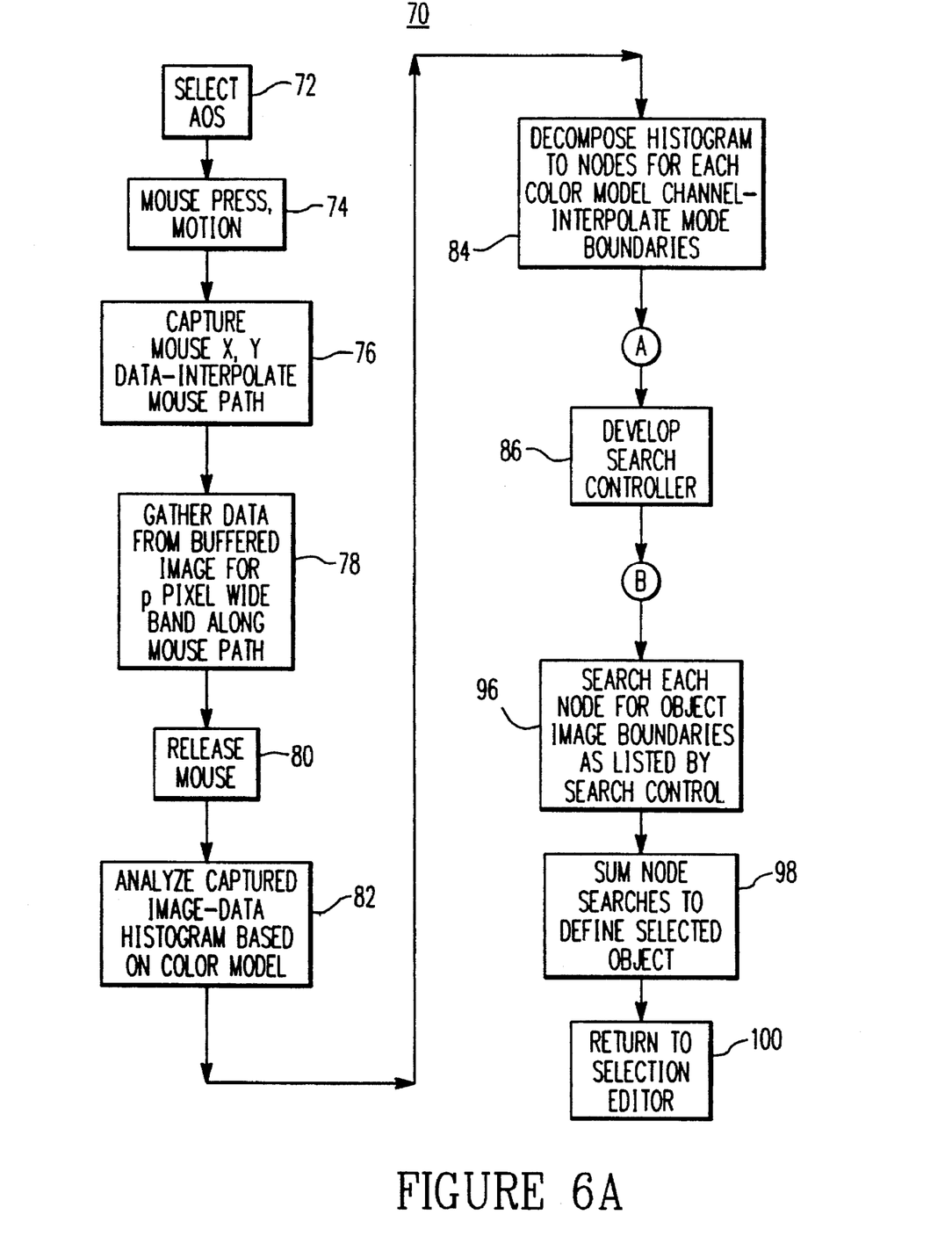
FIGS. 6A and 6B show a flow chart representing a procedure employed in the work station of FIG. 4 to provide automatic object selection in accordance with the present invention.

In FIG. 6A, there is shown a flow chart illustrating a programmed procedure preferred for the automatic object selector (AOS) included in the selector window control 64 (FIG. 4) and operated in accordance with the principles of the invention. After the operator makes a selector request, the selector control window is opened and the AOS selector can then be called.

After the operator selects the AOS in block 72, the mouse is clicked and dragged to define a mouse path across a displayed image in the image display window, so that the mouse path captures representative data from a desired object, which occupies an image area which is a portion of the total image, as indicated by block 74.

In functional block 76, X and Y mouse positions are correlated with captured data contiguously along the mouse path. Conventional interpolation calculations are used to provide position data for the entire mouse path.

Next, color data is gathered in block 78 from the image buffer 61 for pixels along the mouse path. Generally, the pixels from which data is gathered are preferably located in a pixel band having a width of pixels and extending along the mouse path. In the preferred embodiment, the pixel band is 10 pixels wide, with 5 pixels on each side of a center pixel line of the mouse path.

In accordance with the present invention, means are employed to make a statistical analysis of the map data to distinguish the object from its context. Generally, a desired object is automatically selected in accordance with the present invention if the object is visibly distinguishable from its context in the displayed image.

The gathered data in the preferred embodiment is determined from red, green and blue values for each feedback pixel specified in the image buffer 61. Thus, hue (H), saturation (S) and luminance (L) values are calculated from the R, G, and B values for use in the preferred structuring of the object color search model for the reasons previously described. Basically, hue corresponds to color, saturation corresponds to color purity (amount of gray combined with the color), and luminance corresponds to the combination of brightness and contrast.

Once the mouse is released in block 80, the captured image data is analyzed by analysis means in block 82. The analysis means preferably operates on the basis of statistical principles. In the preferred embodiment, a histogram based on the color search model is created from the captured image data.

Figure 7:
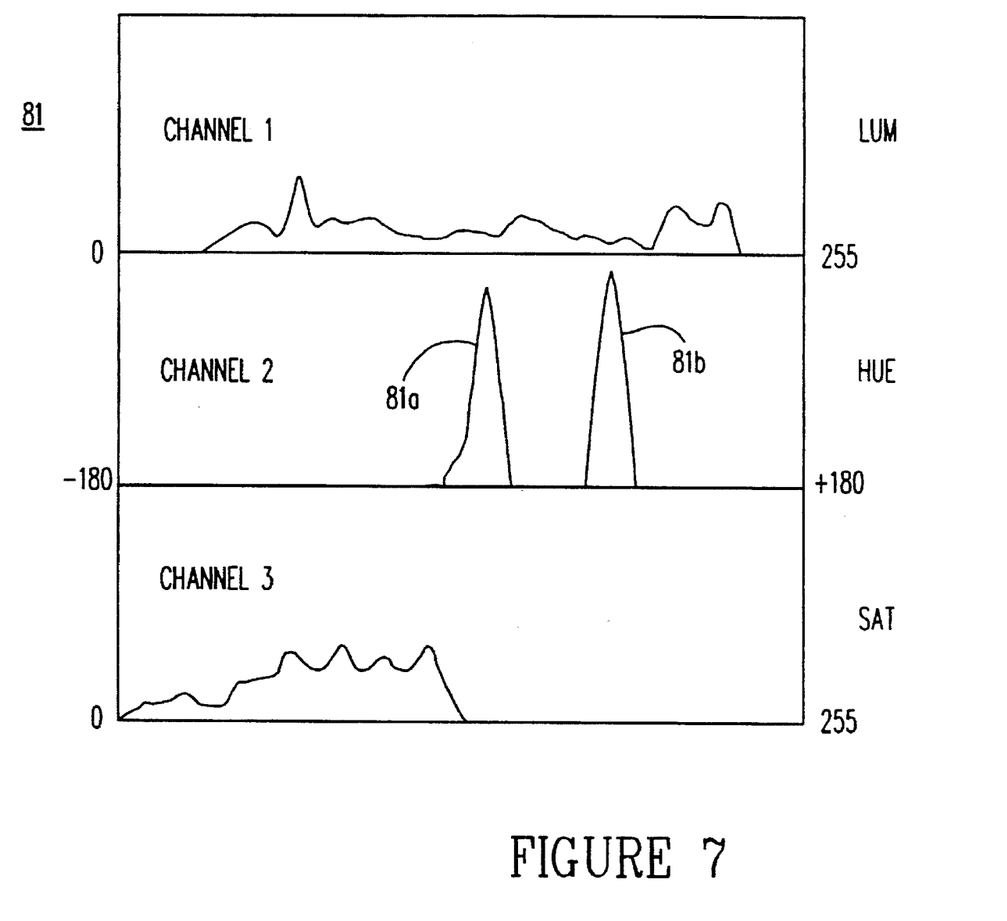
FIG. 7 shows a graph of an illustrative histogram for color data gathered to provide a basis for developing object search criteria in accordance with the present invention.

An illustrative histogram 81 is shown in FIG. 7. The histogram 81 has three components, one for each of three color data channels L, H, and S in the object search model. L, H and S are the preferred luminance, hue, and saturation color descriptors.

Each histogram component is a plot of the frequency of values descriptor. Thus, L and S values are plotted against a range of of the color descriptor against the range of values for the color values from 0 to 255 which defines the full original color range. Hue values are plotted against an angle range from −180 to +180, since hue is graphically represented in the system by a circle within which hue continuously varies about the circle as a function of angle.

It is noteworthy that the hue channel contains two sharp nodes 81a and 81b. The reason for this is that, in this particular case, the dragged image area included a red flower (node 81a) and a yellow flower (node 81b).

With reference again to FIG. 6A, the histogram is decomposed in block 84 into one or more nodes for each color data channel in the color search model. Each identified node in each histogram channel is interpolated to its boundaries with the use of conventional interpolation calculation procedures.

A search controller is then developed in block 86 to define one or more criteria under which the object search is to be conducted. Each criterion corresponds to a program selected color variable or to a user specification.

The term "variable" herein refers to either basic color values (such as R,G and B) or to a color descriptor. As previously indicated, a color descriptor is a variable that is computed from basic color values. Color descriptors typically represent more visible attributes of an image as basic color values are changed in the image.

Figure 6B:
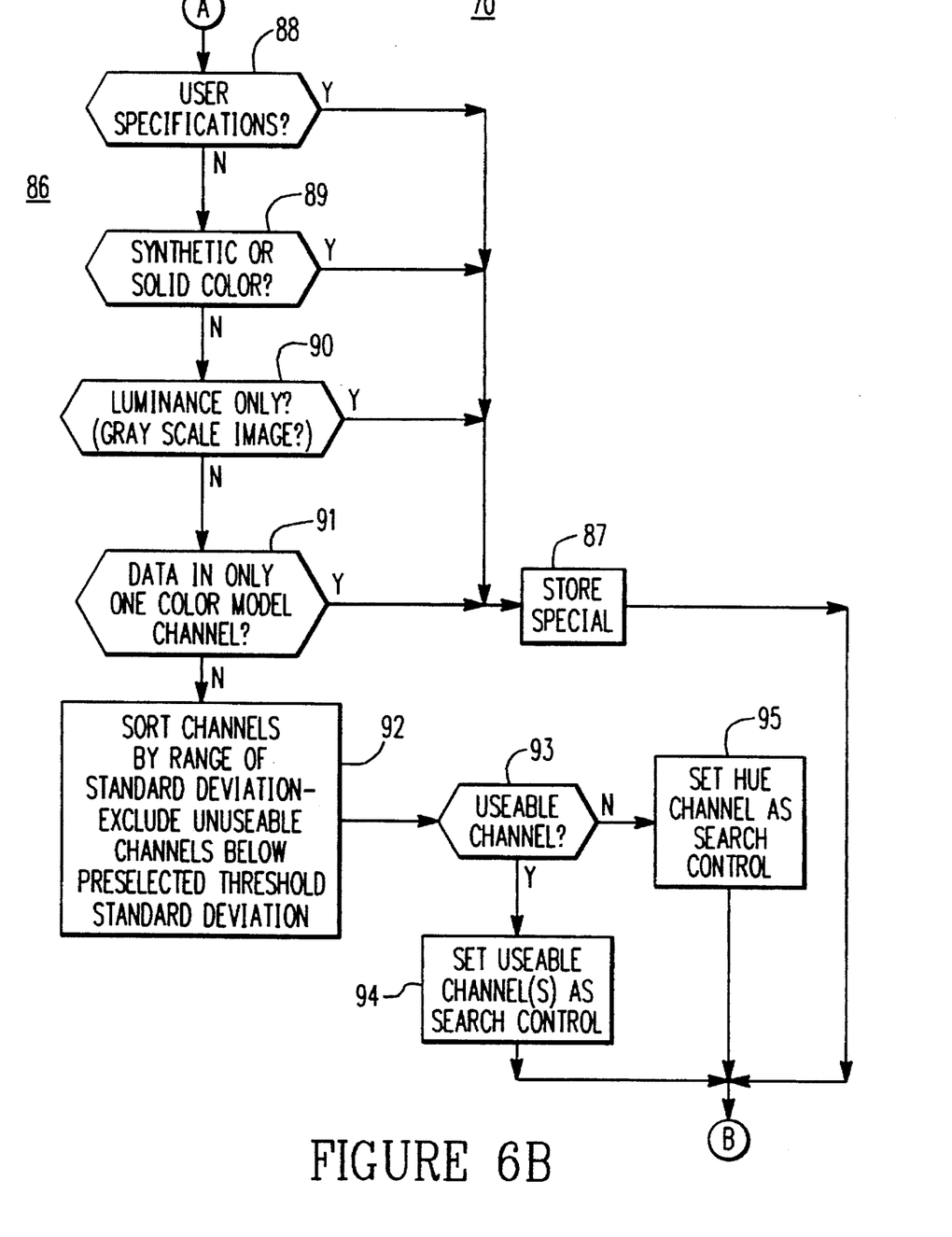

The procedure 86 for developing the search controller is broken into greater detail in FIG. 6B. Thus, tests are first run to determine whether a user specification or special criteria apply to the current search, and, if so, block 87 records the user specified criteria or the special criteria as the applicable criteria for the object search, i.e., as the controller of the object search. Block 88 tests for user specified criteria and blocks 89–91 respectively test for synthetic or solid color luminance or gray scale image only, and data in only one color data channel in the search model.

If no special or user criteria apply, block 92 sorts the color data channels by range of standard deviation. Channels below a preselected threshold standard deviation are excluded as unuseable. Block 93 then detects whether one or more usable channels are available for the object search.

If so, the usable channels are set as the search control channels in block 94. If not, block 95 sets the hue channel as the search channel.

Once the search controller is defined by the block 86, the image is searched in accordance with the boundaries or constraints imposed by the search controller, and specifically in accordance with each node in each color data channel selected for the search model (block 96). Generally, the search is made histogram component-by-histogram component and node-by-node.

The searching tool may be a conventional search algorithm such as a scan line seed fill algorithm. Reference is made to a textbook entitled "PROCEDURAL ELEMENTS FOR COMPUTER GRAPHICS" published by McGraw-Hill Book Company and authored by David F. Rogers for more information on search algorithms. In the operation of such a search algorithm, pixel position data is received as inputs, and the algorithm searches in divergence from multiple pixel position seed points to identify pixels in a contiguous area to a border at which the context is reached and the search is ended.

In block 98, results of multiple channel searches are added to define the object found in the search. After the search results are completed, the identified object in the image may be edited apart from the rest of the image through operation of the editor window control 66.

The foregoing description of the preferred embodiment of the invention has been presented for purposes of illustration and description. The description is not intended to be exhaustive or to limit the invention to the precise form disclosed, and modifications and variations of the invention are possible in light of the above disclosure or may be acquired from practice of the invention. It is intended that the description provide an explanation of the principles of the invention and its practical application to enable one skilled in the art to use the invention in various embodiments and with various modifications as are suited to the particular use contemplated. It is intended that the scope of the invention be defined by the claims appended hereto, and their equivalents.

What is claimed is:

1. An image editor for an image processing system, said editor comprising:

means for storing pixel color data for an image to be edited;

means for displaying the stored image on a monitor screen;

means for designating a screen path which identifies an object and which provides position and color date for use in determining pixels corresponding to the object in the displayed image by differentiating the object from its nearby context;

means for detecting pixel position data corresponding to the screen path;

means for determining in real time one or more criteria for a search controller as a function of screen path position data and screen path color data;

means for searching image pixels to find those pixels diverging from the screen path and satisfying the criteria set by the search controller thereby determining a contiguous image area corresponding to the image area occupied by the selected object and thereby identifying the selected object relative to its context; and means for applying a preselected color edit operation to the identified object within the image.

2. The image editor of claim 1 wherein said search criteria determining means includes:

means for determining one or more color data variables from the stored pixel color data for pixels along the screen path; and means for determining said criteria for the search controller at least as a function of the determined color data variables.

3. The image editor of claim 1 wherein said storing means includes:

a color lookup register bank in which respective registers contain respective color values for respective colors in a preselected color set where each color value is defined by a set of values for preselected basic color components;

a pixel buffer in which the color of each image pixel is stored as a lookup register value; and wherein said color edit applying means includes:

means for implementing color edit actions by modifying stored color values for lookup registers containing original colors changed by edit action; and means for selecting image buffer pixels corresponding to the identified object for application of edit actions.

4. The image editor of claim 1 wherein:

the stored pixel color data are values for preselected basic colors;

said search criteria determining means includes means for determining, in respective multiple data channels, values for preselected multiple color descriptor variables from the detected basic color data values; and the available search criteria, from which the one or more selected search criteria are determined, include respective criteria based on the respective color descriptor variable channels.

5. The image editor of claim 4 wherein said color descriptor variables are hue, saturation and luminance.

6. The image editor of claim 4 wherein the available search criteria include a user specification, and, if entered, a user specification selected as the search criteria.

7. The image editor of claim 6 wherein the available search criteria include a synthetic or solid color, and luminance only, and the selected criterion is the synthetic or solid color or luminance if so indicated by the color data for detected pixels.

8. The image editor of claim 4 wherein the selected search criterion is one of the color descriptor data channels if said one channel is the only color descriptor channel having data values for the detected pixels.

9. The image editor of claim 1 wherein said search criteria determining means includes means for statistically analyzing said stored pixel color data in accordance with predetermined statistical principles to select as said search criteria a portion or portions of said stored color pixel data that will most likely provide effective automatic identification of said object.

10. The image editor of claim 9 wherein: the stored pixel color data are values for preselected basic colors; and each statistically selected color data portion is a portion of the color data in one of said color descriptor variable channels.

11. The image editor of claim 10 wherein said color descriptor variables are hue, saturation and luminance.

12. The image editor of claim 9 wherein:

said statistical analyzing means generates a histogram that functionally relates frequency of color data to color data values; and each selected color data portion is a node of said histogram.

13. The image editor of claim 10 wherein:

said statistical analyzing means generates a histogram that functionally relates frequency of color data to color data values; and said histogram includes a component histogram for each color descriptor variable channel.

14. The image editor of claim 13 wherein the color descriptor channels are hue, saturation and luminance.

15. The image editor of claim 12 wherein said image searching means executes an image data search in accordance with each node and sums the results.

16. The image editor of claim 13 wherein:

said search criteria determining means includes means for sorting color descriptor channels by range of standard deviation and for excluding as unusable those channels having a standard deviation below a preselected threshold value; and said search criteria determining means selects for use as search criteria those channels having a standard deviation above said threshold value.

17. The image editor of claim 16 wherein the color descriptor channels are hue, saturation and luminance.

18. The image editor of claim 17 wherein the selected search criteria is hue if no other channel is usable.

19. The image editor of claim 1 wherein:

means are provided for managing a window structure on said screen with said window structure including a window for said image and a menu window for predetermined selectors applicable to said image;

said selectors include an automatic object selector; and said screen path designating means is employed to select said automatic object selector when it is desired to apply edit actions only to an object within said image.

20. The image editor of claim 19 wherein said screen designating means is a mouse.

21. The image editor of claim 1 wherein said pixel position detecting means gathers color pixel data for a pixel band of predetermined pixel width along said path.

22. An automatic object selector for an image processing system in which color data is stored for pixels of an image to be displayed on a screen for editing, said selector comprising:

means for detecting pixel position data corresponding to a path designated on said screen to identify an object occupying an area of the displayed image;

means for determining in real time one or more criteria for a search controller as a function of the stored pixel color data for pixels along the screen path;

means for searching the image pixels to find those pixels diverging from the screen path and satisfying the search controller criteria thereby determining a contiguous image area corresponding to the image area occupied by the selected object and thereby identifying the object and its boundary; and means for applying color edit actions to the identified object within the image.

23. The automatic object selector of claim 22 wherein:

the stored pixel color data are values for preselected basic colors;

said search criteria determining means includes means for determining, in respective multiple data channels, values for preselected multiple color descriptor variables from the detected basic color data values; and the available search criteria, from which the one or more selected search criteria are determined, include respective criteria based on the respective color descriptor variable channels.

24. The automatic object selector of claim 23 wherein said color descriptor variables are hue, saturation and luminance.

25. The automatic object selector of claim 22 wherein said search criteria determining means includes means for statistically analyzing said stored pixel color data in accordance with predetermined statistical principles to select as said search criteria a portion or portions of said stored color pixel data that will most likely provide effective automatic identification of said object.

26. The automatic object selector of claim 25 wherein:

said statistical analyzing means generates a histogram that functionally relates frequency of color data to color data values; and each selected color data portion is a node of said histogram.

27. A process for editing images in an image processing system, the steps of said process comprising:

storing color data for pixels of an image to be edited;

displaying the stored image on a monitor;

designating a screen path that identifies an object in the image;

detecting pixel position data corresponding to the screen path;

determining pixel color data corresponding to the pixel position data;

determining in real time at least one criterion for controlling an object search as a function of the pixel color data for pixels along the screen path;

searching the image pixels to find those pixels diverging from the screen path and satisfying the search controller criteria thereby determining a contiguous image area corresponding to the area occupied by the selected object and thereby identifying the object and its boundary relative to its context; and applying color edit actions to the identified object image within the image.

28. The process of claim 27 wherein:

the stored pixel color data are values for preselected basic colors; and wherein said search criteria determining step includes:

selecting values for preselected multiple color descriptor variables from the detected basic color data values; and using said color descriptor variable channels as available search criteria.

29. The process of claim 27 wherein said search criteria determining step includes statistically analyzing the stored pixel color data in accordance with predetermined statistical principles to select as the search criteria a portion or portions of the stored pixel color data that most likely will provide effective automatic identification of the object.

30. The process of claim 29 wherein said analyzing step includes generating a histogram that functionally relates frequency of color data to color data values with each color data portion being a node of said histogram.

31. An image editor for an image processing system, said editor comprising:

means for storing pixel color data for an image to be edited;

means for displaying the stored image on a monitor screen;

means for designating a screen path which identifies an object and which provides position and color data for use in determining pixels corresponding to the object in the displayed image by differentiating the object from its nearby context, the object occupying an area of the displayed image having multiple pixels with differently valued color variables;

means for detecting pixel position data corresponding to the screen path;

means for determining in real time one or more criteria for a search controller as a function of screen path position data and screen path color data;

means for searching image pixels to find those pixels diverging from the screen path and satisfying the criteria set by the search controller thereby determining a contiguous image area corresponding to the image area occupied by the selected object and thereby identifying the selected object relative to its context; and     means for applying a preselected color edit operation to the identified object within the image.

\* \* \* \* \*

UNITED STATES PATENT AND TRADEMARK OFFICE
CERTIFICATE OF CORRECTION

PATENT NO. : 5,526,020
DATED : June 4, 1996
INVENTOR(S) : CAMPANELLI et al.

It is certified that error appears in the above-indentified patent and that said Letters Patent is hereby corrected as shown below:

Title page, column 1, line 2 of "Inventors", after "Dennis L. Venable, Rochester", insert --Zhigang Fan, Webster-- and change "both" to --all--.

Signed and Sealed this

Tenth Day of September, 1996

*Attest:*

BRUCE LEHMAN

*Attesting Officer*     *Commissioner of Patents and Trademarks*